United States Patent [19]
Schulz-Hennig

[11] Patent Number: 5,165,079
[45] Date of Patent: Nov. 17, 1992

[54] OPTICAL COLOR-SPLITTER ARRANGEMENT

[75] Inventor: Jorg Schulz-Hennig, Zurich, Switzerland

[73] Assignee: Linotype-Hell AG, Fed. Rep. of Germany

[21] Appl. No.: 730,806

[22] PCT Filed: Jan. 24, 1990

[86] PCT No.: PCT/DE90/00043
§ 371 Date: Jul. 29, 1991
§ 102(e) Date: Jul. 29, 1991

[87] PCT Pub. No.: WO90/08969
PCT Pub. Date: Aug. 9, 1990

[30] Foreign Application Priority Data
Feb. 2, 1989 [DE] Fed. Rep. of Germany ....... 3903019

[51] Int. Cl.[5] .................... G02B 27/10; G02B 27/14; G02B 5/28
[52] U.S. Cl. .................................................. 359/634
[58] Field of Search ............... 359/634, 629, 628, 583, 359/589, 590, 577

[56] References Cited
U.S. PATENT DOCUMENTS

| | | | |
|---|---|---|---|
| 3,359,851 | 12/1967 | Lipschutz et al. | 359/634 |
| 3,586,760 | 9/1968 | Dillenburger | 359/634 |
| 3,718,751 | 2/1973 | Landre et al. | 359/634 |
| 3,748,471 | 7/1973 | Ross et al. | |
| 3,753,822 | 8/1973 | Heinrich | 156/101 |
| 4,185,902 | 1/1980 | Plaot | |
| 4,409,614 | 10/1983 | Eichler et al. | |
| 4,827,334 | 5/1989 | Johnson et al. | 359/629 |

FOREIGN PATENT DOCUMENTS

| | | |
|---|---|---|
| 0174778 | 3/1986 | European Pat. Off. |
| 1101792 | 3/1961 | Fed. Rep. of Germany |
| 1597209 | 10/1969 | Fed. Rep. of Germany |
| 2311206 | 12/1973 | Fed. Rep. of Germany |
| 2844158 | 4/1980 | Fed. Rep. of Germany |
| 2000463 | 9/1969 | France |
| 55-044914 | 3/1980 | Japan |
| 58117094 | 5/1985 | Japan |
| 628153 | 2/1982 | Switzerland |
| 2155196 | 9/1985 | United Kingdom |
| 2223324 | 4/1990 | United Kingdom ................ 359/634 |

*Primary Examiner*—Jon W. Henry
*Attorney, Agent, or Firm*—Hill, Van Santen, Steadman & Simpson

[57] ABSTRACT

An optical color-splitter arrangement comprises a color splitter for spectral resolution of a light beam into at least two chromatic light beams of different spectral ranges. A correction device is arranged in each of the chromatic light beams for improving a color selectivity of the color splitter. Each of the correction devices has at least two dichroitic mirrors successively arranged on an optical axis of the respective chromatic light beam, each dichrotic mirror being arranged relative to the optical axis so as to define a normal operating position angle of incidence for the corresponding dichroitic mirror. Spectral filter curves of the at least two dichroitic mirrors for each correction device are selected such that one of the two dichroitic mirrors reflects a short-wave light component and the other dichroitic mirror reflects a long-wave light component of the spectral range of the corresponding light beam so that a resulting light component allowed to pass through the corresponding correction device forms a light beam having a constricted spectral range. This spectral range can be precisely set in a simple way and can always be precisely reproduced.

8 Claims, 2 Drawing Sheets

OPTICAL COLOR-SPLITTER ARRANGEMENT

BACKGROUND OF THE INVENTION

The invention refers to the field of technical optics and is directed to an optical color-splitter arrangement in an optoelectronic color scanner for recognizing or, respectively, for separating colors scanned in a color area.

Such an optoelectronic color scanner is essentially composed of the optical color-splitter arrangement for the individual color channels for resolving the light reflected by or allowed to pass by the scanned color area into at least two color components of different spectral ranges, usually into three spectral color components "red", "green" and "blue", and of optoelectronic transducers with which the spectral color components are converted into electrical color signals.

Dichroitic mirrors are predominantly employed for spectral resolution of the light, these having the properties of reflecting, i.e. blocking, light of a limited spectral range and allowing light of the remaining spectral range to pass. In order to achieve a good color selectivity of the color-splitter arrangement, the pass ranges and blocking ranges of the filter curves of the dichroitic mirrors must be optimally well-tuned to the spectral ranges of the light to be separated from one another.

The spectral filter curves of commercially obtainable dichroitic mirrors, however, have manufacture-caused tolerances of the filter edges between pass ranges and blocking ranges.

In order to create precisely defined spectral ranges for the color-splitter arrangement and in order to enhance the color selectivity by constricting the spectral ranges, correction means are allocated to every color channel of the color-splitter arrangement, the edges of the filtered curves of the dichroitic mirrors being capable of being corrected with these correction means. Glasses having colored additives, and which are referred to as colored glass filters, or glasses that absorb short-wave light, and which are referred to as stop glasses, are employed as correction means.

A correction or respectively, a balancing of the spectral ranges of the color-splitter arrangement under measurement control is not only required in the manufacture of the color-splitter arrangement but is also required given every replacement of a dichroitic mirror or of one of the optoelectronic transducers of the color scanner since the spectral sensitivity distribution of the entire color scanner can change when replacing an optoelectronic transducer.

Practice has shown that the spectral balancing of a color-splitter arrangement is time-consuming and also cost-intensive since a considerable expense for measurement is required and a great number of colored glass filters or stop glasses having different filter curves must be kept on hand.

A further disadvantage is comprised therein that high light losses due to absorption in the glasses can arise given the employment of colored glass filters and stop glasses as correction means. For compensating these light losses, the amplification of the color signals must then be increased, as a result whereof the noise part in the color signals rises and the color selectivity of the color scanner decreases.

SUMMARY OF THE INVENTION

The invention is therefore based on the object of specifying a color-splitter arrangement wherein the above described disadvantages are avoided and wherein, for improving the color selectivity, defined spectral ranges can be relatively precisely set in a simple way and can always be precisely reproduced.

With the optical color-splitter arrangement of the invention, a color splitter means for spectral resolution of a light beam into at least two chromatic light beams of different spectral ranges is provided. A correction device means is arranged in each of the chromatic light beams for improving a color selectivity of the color splitter means. Each of the correction device means has at least two dichroitic mirrors successively arranged on an optical axis of the respective chromatic light beam. Each dichroitic mirror is arranged relative to the optical axis so as to define a normal operating position angle of incidence for the corresponding dichroitic mirror. Spectral filter curves of the at least two dichroitic mirrors for each correction device means are selected such that one of the two dichroitic mirrors reflects a short-wave light component, and the other dichroitic mirror reflects a long-wave light component of the spectral range of the corresponding light beam such that a resulting light component which is allowed to pass through the corresponding correction device means forms a light beam having a constricted spectral range.

The invention shall be set forth in greater detail below with reference to FIGS. 1 through 6.

DESCRIPTION OF THE PREFERRED EMBODIMENTS

Figure 1:
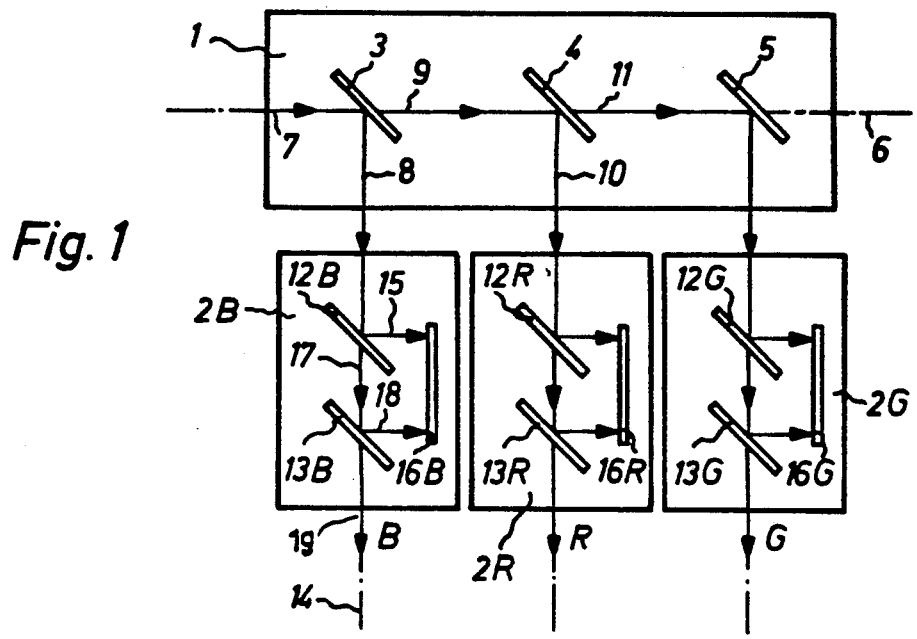
FIG. 1 is a first exemplary embodiment of an optical color-splitter arrangement of the invention.

FIG. 1 shows a first exemplary embodiment of an optical color-splitter arrangement of the invention. The optical color-splitter arrangement is composed of the actual color splitter 1 with which the light is resolved into at least two spectral ranges, that is into three spectral ranges in the exemplary embodiment, namely "blue" (B), "red" (R) and "green" (G), and of the optical correction devices 2B, 2R and 2G for fine-tuning of the individual spectral ranges.

The color splitter 1 is composed of dichroitic mirrors 3 and 4 and of a metal mirror 5 that are arranged successively on the optical axis 6 of a light beam 7 incident into the color splitter 1. The mirror faces of the mirrors 3, 4 and 5 are turned by an angle, that is an angle of 45° in the exemplary embodiment, relative to the optical axis 6.

The dichroitic mirrors 3 and 4, also referred to as cut-off filters, have the property of reflecting or, respectively, of blocking (low transmissivity) the light component of a defined, limited range of the spectrum and of allowing the light component of the remaining range of the spectrum to pass (high transmissivity). The spectral behavior of a dichroitic mirror is described by what is referred to as the filter curve that reproduces the curve of the transmissivity $\tau$ of the dichroitic mirror dependent on the wavelength $\lambda$ of the incident light, whereby the edge of the filter curve, i.e. the transition from a high transmissivity to a low transmissivity or, respectively, vice versa, defines the boundary between the spectral blocking range and pass range of the dichroitic mirror.

Dichroitic mirrors are manufactured by vapor-depositing a clear glass plate with light-transmissive, mineral substances having different refractive indices, whereby the layer thickness lies in the range of the wavelength of the light. The spectral-dependent effect of the light reflection is achieved by interference. Every dichroitic mirror is characterized by the wavelength at which the edge of the filter curve lies and by the incident angle for the light. The structure and functioning of such dichroitic mirrors that are commercially available are known to a person skilled in the art. For example, "Bauelemente der Elektronik", Naumann & Schroeder, Munich and Vienna, 1983, is referenced for more detailed information.

The spectral filter curve of the dichroitic mirror 3 is selected such that, for the incident light beam 7, the mirror 3 reflects only the light component of the blue spectral range as light sub-beam 8 into the color channel "blue" (B) and allows the remaining light component to pass through to the dichroitic mirror 4 as light sub-beam 9.

The filter curve of the dichroitic mirror 4, by contrast, is such that, of the light sub-beam 9, the dichroitic mirror 4 reflects only the light component of the red spectral range as light sub-beam 10 into the color channel "red" (R) and allows the remaining light component of the green spectral range to pass through as light sub-beam 11 which is steered by the metal mirror 5 into the color channel "green" (G).

Figure 2:
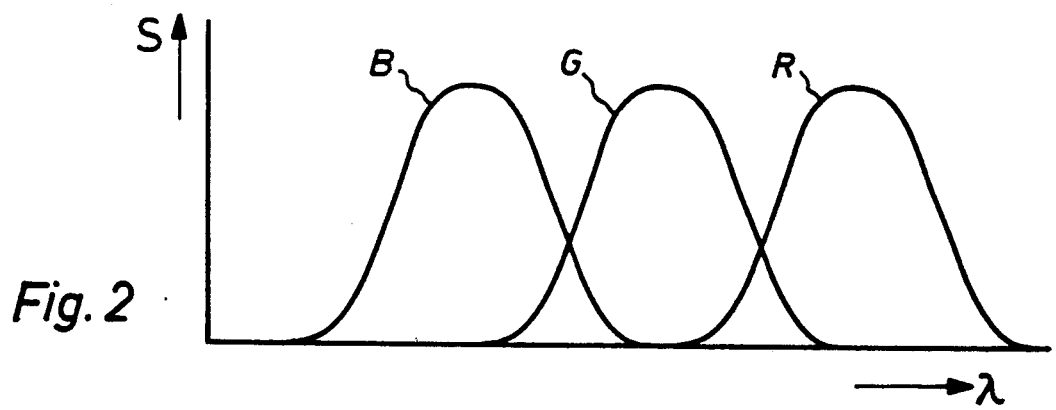
FIG. 2 is a graphic illustration of the spectral curves of a color-splitter arrangement.

As a graphic illustration, FIG. 2 shows the spectral curves $S=f\lambda$ of the color components "blue" (B), "red" (R) and "green" (G) that appear at the output of the color splitter 1.

The correction devices 2B, 2R and 2G in FIG. 1 are identically constructed, so that only the correction stage 2B for the color channel "blue" shall be set forth below. The correction means 2B is composed of two more dichroitic mirrors 12B and 13B that are successively arranged on the optical axis 14 of the light sub-beam 8. Every dichroitic mirror is situated in a normal position relative to the optical axis of the light sub-beam 8 such that the light sub-beam 8 is incident onto the mirror face at the prescribed incident angle. In the exemplary embodiment, the mirror faces lie parallel relative to one another and the incident angles amount to 45°. The dichroitic mirrors 12B and 13B are selected such that the edges of the filter curves are tuned to the boundaries of the spectral range of the color channel "blue" within the spectrum.

The dichroitic mirror 12B optically acts as a short-wave cut-off filter with which the short-wave light component 15 in the light sub-beam 18 at the lower limit of the spectral range of the color channel "blue" allowed to pass is reflected onto a light-absorbent surface 16B (optical sump) and becomes ineffective, whereas the remaining spectral light component 17 of the light sub-beam 8 is allowed to pass to the dichroitic mirror 13B nearly loss-free.

The dichroitic mirror 13B, by contrast, optically acts as a long-wave cut-off filter with which the long-wave light component 18 in the remaining spectral light component 17 at the upper limit of the spectral range of the color channel "blue" allowed to pass is reflected onto the light-absorbing surface 16B, whereas the remaining light component 19 is allowed to pass through the dichroitic mirror 13B nearly loss-free.

The spectral light component 19 that has passed through the two dichroitic mirrors 12B and 13B defines the constricted spectral range of the color channel "blue".

The dichroitic mirrors 12B and 13B of the correction means 2B in the invention can be turned by a few degrees, for example, up to $\pm 6°$, from the normal position in both directions around an axis oriented perpendicularly relative to the plane of the light sub-beams 8, 9 and 10. It may be turned with mechanical devices (not shown). Due to the rotation of the dichroitic mirrors 12B and 13B, the edges of the corresponding filter curves, and thus, the limits between the spectral blocking range and the pass range can be shifted within symmetrical tuning ranges. As a result thereof, a sensitive balancing of the spectral edges, and thus, of the limits of the spectral range in the color channel "blue" allowed to pass, is thereby advantageously enabled. The spectral edges of the filter curves can be farther improved by employing linearly polarized light.

The dichroitic mirrors 12R and 12G are also employed as short-wave cut-off filters in the correction devices 2R and 2G, and the dichroitic mirrors 13R and 13G are employed as long-wave cut-off filters in the correction devices 2R and 2G, their filter curves being respectively tuned to the position of the spectral ranges of the color channels "red" and "green" within the spectrum that is allowed to pass.

As already set forth for the correction stage 2B of the color channel "blue", the dichroitic mirrors 12R, 12G, 13R and 13G in the correction stages 2R and 2G are also arranged to be turnable in a sensitive manner, so that the color selectivity of the color splitter 1 can be precisely and sensitively individually tuned by constricting the spectral ranges, i.e. by adapting the edge steepnesses of the filter curves to the spectral ranges of the incident light that are to be separated from one another.

Figure 3:
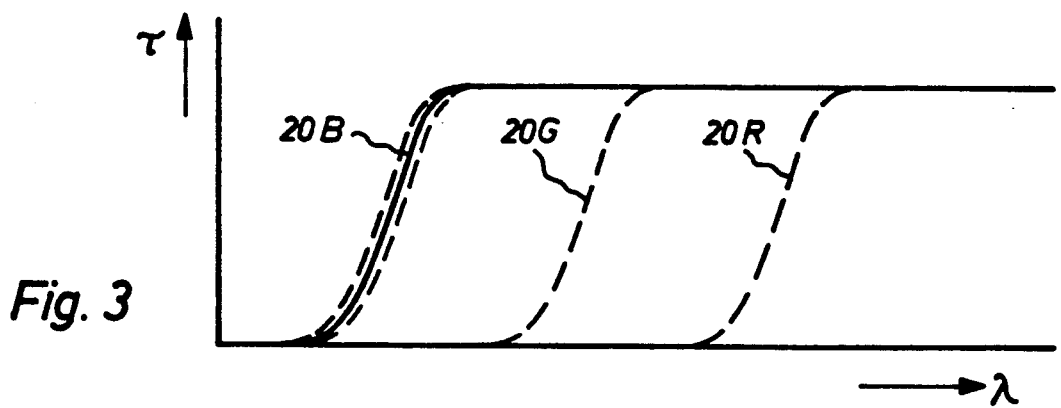
FIG. 3 shows the filter curves of a cut-off filter for short-wave light.

FIG. 3 shows the filter curves 20B, 20R and 20G of the dichroitic mirrors 12B, 12R and 12G or, respectively, of the short-wave cut-off filters, whereby the edges of the filter curves 20B, 20R and 20G each respectively lie in the area of the lower limits of the spectral ranges of the color channels "blue", "red" and "green" allowed to pass.

Figure 4:
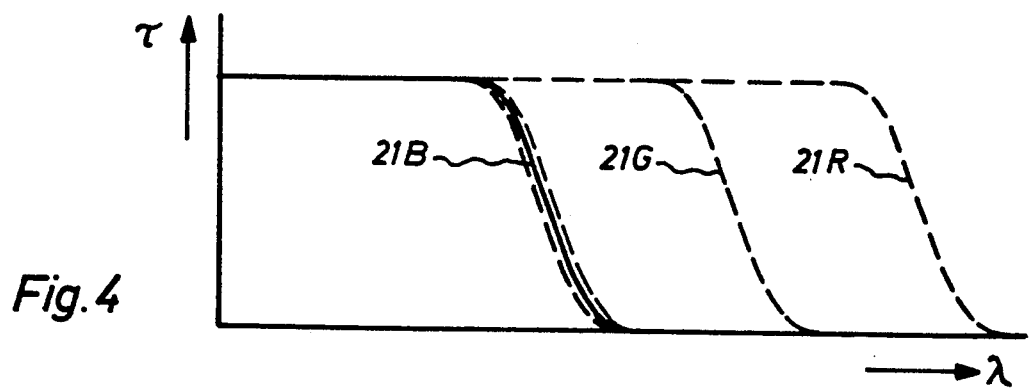
FIG. 4 illustrates the filter curves of a cut-off filter for long-wave light.

FIG. 4 shows the corresponding filter curves 21B, 21R and 21G of the dichroitic mirrors 13B, 13R and 13G or, respectively, of the long-wave cut-off filters, whereby the edges of the filter curves 21B, 21R and 21G in this case each respectively lie in the area of the upper limits of the spectral ranges of the color channels "blue", "red" and "green" allowed to pass.

The shift of the edges of the filter curves due to a rotation of the dichroitic mirrors is indicated in broken lines in FIGS. 3 and 4 for the filter curves 20B and 21B.

The functioning of the correction circuits 2B, 2R and 2G of the invention for the color splitter 1 shall be illustrated with reference to the example of the "blue" color channel.

Figure 5:
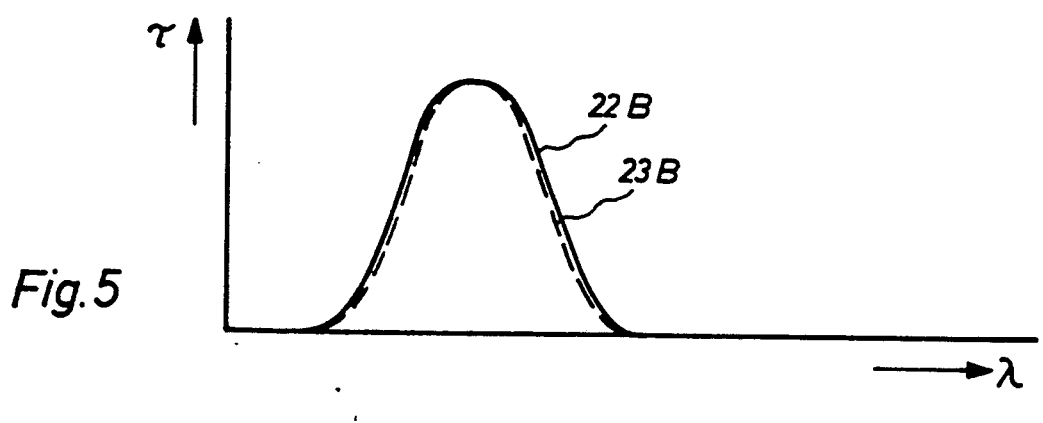
FIG. 5 shows a resultant filter curve.

FIG. 5 shows the filter curve 22B for the light of the blue spectral component at the input of the correction stage 2B and shows the resultant filter curve 23B at the output of the correction stage 2B that is acquired with the correction stage 2B of the invention.

A comparison of the two filter curves 22B and 23B shows that the blue spectral range has been constricted or, respectively, more precisely defined with the correction means 2B by shifting the edges and that the color selectivity of the "blue" color channel has thus been enhanced.

By employing correction devices of the invention having rotatably seated dichroitic mirrors, this correction effect, compared to traditional corrections, can be advantageously achieved nearly without losses, in a short time and with small technical expense and can nonetheless be exactly and reproducibly achieved due to the possibility of a fine tuning.

Figure 6:
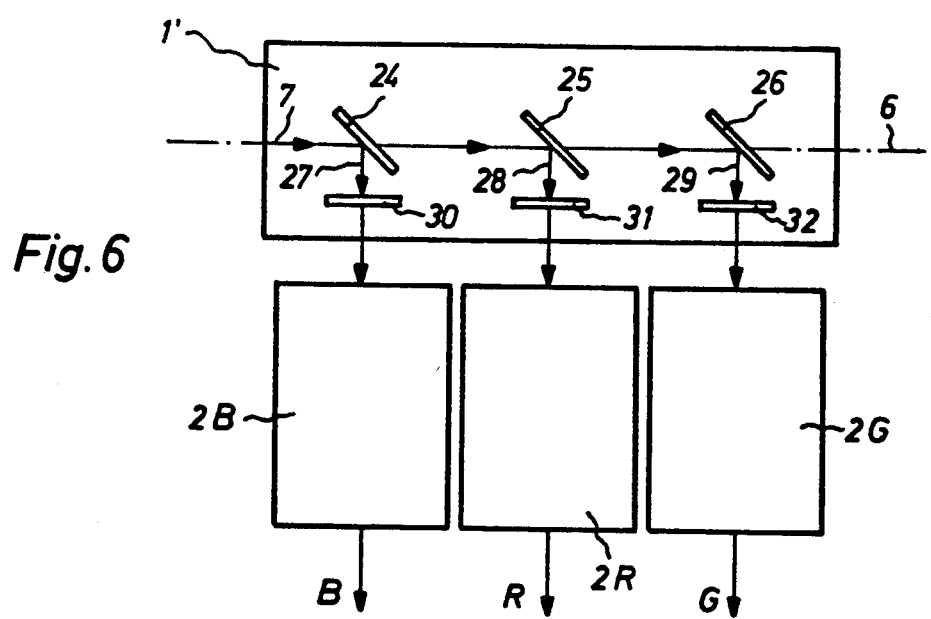
FIG. 6 is a second exemplary embodiment of an optical color-splitter arrangement of the invention.

FIG. 6 shows a second exemplary embodiment of a color-splitter arrangement that differs from the first exemplary embodiment of FIG. 1 on the basis of a different structure of the color splitter 1. The modified color splitter 1' of FIG. 6—likewise designed for resolving the light into three color components "blue", "red" and "green"—is composed of two semi-transparent mirrors 24 and 25 and of a metal mirror 26 that are likewise successively arranged on the optical axis 6. The incident light beam 7 is divided into only three light sub-rays 27, 28 and 29 with the assistance of these mirrors 24, 25 and 26. Color filters or, respectively, interference filters 30, 31 and 32 are arranged in the sub-rays for the following, spectral resolution of the three light sub-rays 27, 28 and 29.

Although various minor changes and modifications might be proposed by those skilled in the art, it will be understood that I which to include within the claims of the patent warranted hereon all such changes and modifications as reasonably come within my contribution to the art.

I claim:

1. An optical color-splitter arrangement, comprising:
   color splitter means for spectral resolution of a light beam into at least two chromic light beams of different spectral ranges;
   correction device means arranged in each of the chromatic light beams for improving a color selectivity of the color splitter means;
   each of said correction device means comprising at least two dichroitic mirrors successively arranged on an optical axis of the respective chromatic light beam, each dichroitic mirror being arranged relative to the optical axis so as to define a normal operating position angle of incidence for the corresponding dichroitic mirror; and
   spectral filter curves of the at least two dichroitic mirrors for each correction device means being selected such that one of the two dichroitic mirrors reflects a short-wave light component and the other dichroitic mirror reflects a long-wave light component of the spectral range of the corresponding light beam such that a resulting light component allowed to pass through the corresponding correction device means forms a light beam having a constricted spectral range.

2. An optical color-splitter arrangement according to claim 1 wherein each of the dichroitic mirrors is mounted for rotation out of its normal operating position in order to achieve a spectral tuning by shifting edges of the filter curves.

3. An optical color-splitter arrangement according to claim 1 wherein the normal operating positions of the dichroitic mirrors relative to the optical axes of the chromatic light beams is substantially 45°.

4. An optical color-splitter arrangement according to claim 1 wherein the dichroitic mirrors are arranged parallel to one another on the optical axes of the chromatic light beams.

5. An optical color-splitter arrangement according to claim 1 wherein light-absorbing surfaces are provided which are positioned such that light components of the dichroitic mirrors which are not allowed to pass are directed onto the light-absorbing surfaces.

6. An optical color-splitter arrangement according to claim 1 wherein said color splitter means is formed of at least one dichroitic mirror.

7. An optical color-splitter arrangement according to claim 1 wherein the color splitter means is formed of at least partially transmissive mirror means for resolving the light beam into light sub-beams, and a corresponding spectral filter being arranged in each of the light sub-beams.

8. An optical color-splitter arrangement, comprising:
   color splitter means for spectral resolution of a light beam into at least two dichroitic light beams of different spectral ranges;
   correction device means arranged in each of the chromatic light beams for more accurately defining short-wave and long-wave limits of the spectral ranges of the respective chromatic light beams;
   each of said correction device means comprising at least two dichroitic mirrors successively arranged on a common optical axis of the respective chromatic light beam; and
   spectral filter curves of the at least two dichroitic mirrors for each of the correction device means being selected such that one of the two dichroitic mirrors reflects short-wave light and the other dichroitic mirror reflects long-wave light of the spectral range of the corresponding light beam such that resulting light allowed to pass through the corresponding correction device means forms a light beam having a constricted spectral range.

* * * * *